United States Patent

[11] 3,628,537

| [72] | Inventors | Wilbur C. Berndt;<br>Harry J. Hardenbrook, both of 3419 S.<br>Harlem Ave., Berwyn, Ill. 60402 |
|---|---|---|
| [21] | Appl. No. | 25,969 |
| [22] | Filed | Apr. 6, 1970 |
| [45] | Patented | Dec. 21, 1971 |

[54] SELF-RETAINING COLD WRAP
9 Claims, 8 Drawing Figs.

[52] U.S. Cl............................................. 128/402,
128/82.1, 128/403, 150/2.4, 150/2.5, 150/2.6
[51] Int. Cl............................................. A61f 7/10
[50] Field of Search............................. 128/82.1,
254, 258, 399, 327, 402, 403; 150/2.1–2.7;
62/530; 165/46

[56] References Cited
UNITED STATES PATENTS

| 2,174,455 | 9/1939 | Bates............................ | 128/258 |
|---|---|---|---|
| 2,288,745 | 7/1942 | Sammis........................ | 128/403 |
| 3,149,943 | 9/1964 | Amadov....................... | 128/402 X |
| 3,548,819 | 12/1970 | Davis............................ | 128/402 X |
| 3,561,435 | 2/1971 | Nicholson.................... | 128/402 X |

Primary Examiner—William E. Kamm
Attorney—Hill, Sherman, Meroni, Gross & Simpson ABSTRACT: A self-retaining cold wrap for application to an animal or human to relieve a traumatized area, reduce inflammatory edema and pain, among other uses. The cold wrap embodies an outer envelope, an inner container for a volatile refrigerant communicating with the interior of the outer envelope to provide reduced temperature and also pressure within the outer envelope, a gastight closure for the outer envelope, and means for attaching the wrap to the body of an animal.

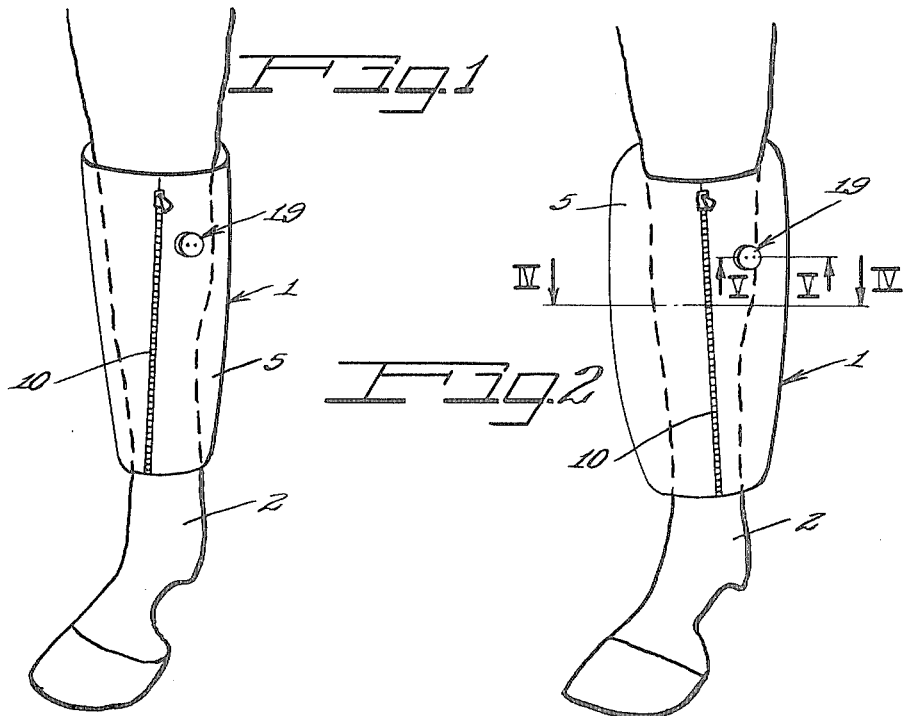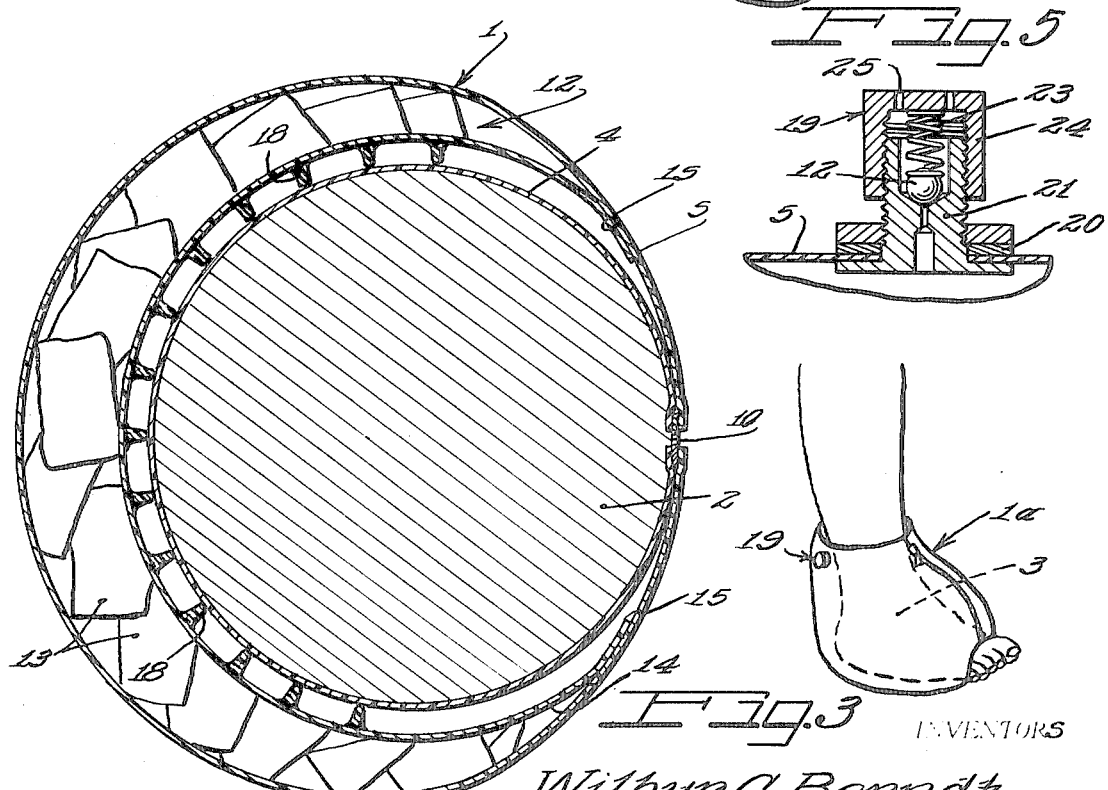

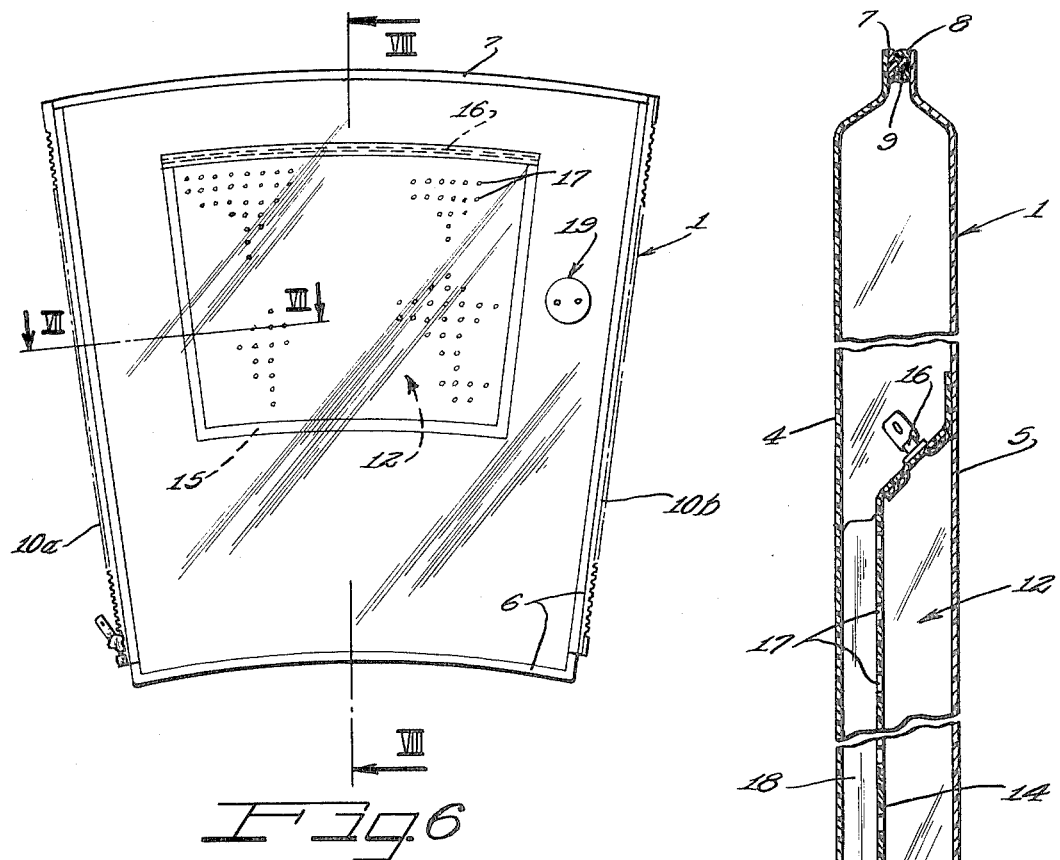
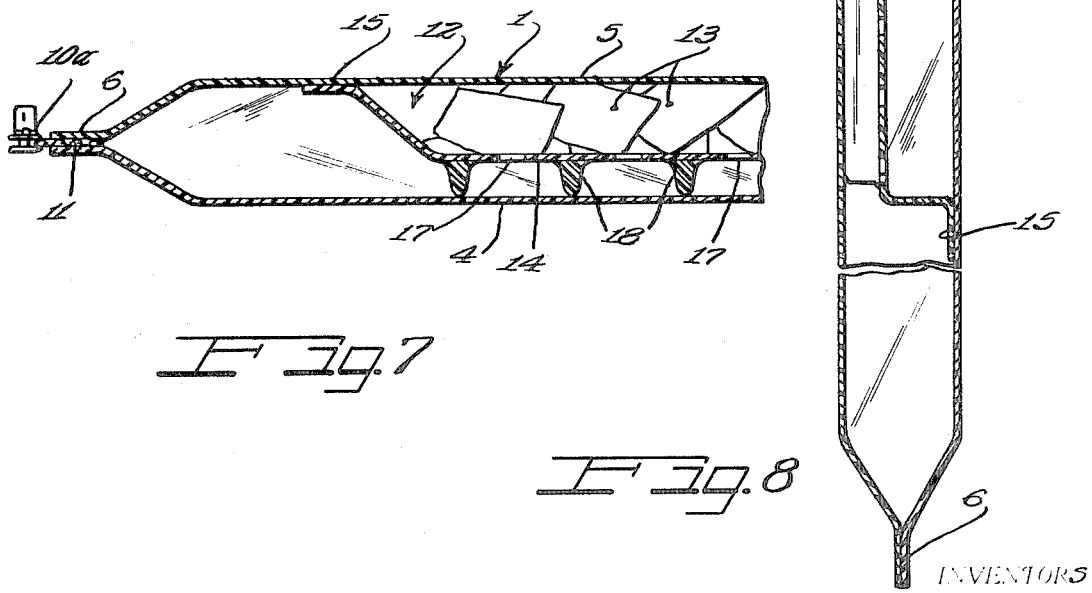

3,628,537

1

SELF-RETAINING COLD WRAP

SUMMARY OF THE INVENTION

The instant invention is applicable to animals of numerous types, including human beings, and where the term "animal" is used herein, it is to be understood as including human beings as the highest type of animal life.

The invention embodies a cold wrap capable of providing both a cooling effect with an associated moderate pressure when applied to an area of the body in which tendons, ligaments, joints, and muscles are undergoing or about to undergo an inflamatory reaction, and thereby minimize the inflamatory edema and associated pain; to aid in the control of hemorrhage and to temporarily hold pressure and antiseptic wraps in place; and another usage would be the protection of an injured part from contamination by foreign material or by bacterial pathogens, among other uses.

The invention has a distinct advantage in connection with the care and treatment of thoroughbred horses, particularly those compelled to expend a great amount of energy in a very short time, such as race horses. One or more of the aforesaid afflictions occurs practically every time a horse is raced, due to the heavy pounding on the track, especially in the forelimbs. Heretofore, over 90 percent of race horses were given an ice water bath on the forelegs following each race. This necessitated an attendant holding the horse with its forelimbs in a tub of ice water for a period of 1 to 3 hours, and the necessary ice was objectionably expensive.

The instant invention eliminates the greater part of that expense in the provision of a self-retaining cold wrap utilizing a volatile refrigerant and which is made gastight. Accordingly, the quantity of volatile refrigerant when permitted to expand within the wrap not only provides the desired chilling effect, but also due to the expansion from a liquid or solid state into a gaseous state provides a moderate pressure around the afflicted area over which the wrap is placed. When so used on a race horse, no attendant is necessary, the horse being ambulatory during the period of treatment and the wrap may be repeatedly used, it only being necessary to insert an indicated amount of volatile refrigerant within the wrap at each usage. Means are also provided to insure the pressure does not become excessive. Once attached, the cold wrap remains in position until it is intentionally removed.

Other objects, features and advantages of the invention will be readily apparent from the following description of a certain preferred embodiment thereof, taken in conjunction with the accompanying drawings, although variations and modifications may be effected without departing from the spirit and scope of the novel concepts of the disclosure.

BRIEF DESCRIPTION OF THE DRAWINGS

FIG. 1 is a fragmentary view in elevation of a cold wrap embodying the principles of the instant invention in operative position over the carpal area of the forelimb of a horse, in uninflated condition;

FIG. 2 is a similar view of the structure of FIG. 1 showing the cold wrap when inflated;

FIG. 3 is a fragmentary view illustrating a cold wrap of slightly different form applied over the ankle and nearby areas of a human foot;

FIG. 4 is a greatly enlarged plan sectional view taken substantially as indicated by the line IV—IV of FIG. 2; FIG. 5 is an enlarged fragmentary vertical sectional view taken substantially as indicated by line V—V of FIG. 2;

FIG. 6 is an enlarged inside face view of the cold wrap before application;

FIG. 7 is an enlarged fragmentary plan sectional view taken substantially as indicated by line VII—VII of FIG. 6; and FIG. 8 is a vertical sectional view taken substantially as indicated by line VIII—VIII of FIG. 6.

DETAILED DESCRIPTION

The instant invention may be made in various sizes and shapes depending upon the body area to which it is applied. The invention is unitary insofar as handling is concerned except for the volatile refrigerant which is placed in a smaller bag or pouch inside a larger bag or envelope that is sealed. There is a communication between the pouch and the inside of the larger bag permitting vaporization of the refrigerant into the larger bag. Immediately upon activating or permitting the refrigerant to vaporize, the cold wrap is secured around the injured portion of a body. As the refrigerant vaporizes, the vapor enters and expands the large bag or envelope thereby creating not only cold but moderate pressure upon the afflicted region. The quantity of the refrigerant can be varied, or the cold wrap taken off, new refrigerant put in, and the cold wrap replaced, depending upon the extent of the injury and the time desired for the wrap to remain in place.

In FIG. 1 we have illustrated the embodiment of the wrap, generally indicated by numeral 1 in operative position over the carpal area of the forelimb 2 of a horse. The bag is shown immediately after application in a substantially deflated position. In FIG. 2 the wrap is shown in its inflated position due to vaporization of the volatile refrigerant. In FIG. 3 we have shown a cold wrap, generally indicated by numeral 1a, in inflated condition and disposed around the ankle and nearby areas of a human foot 3. This wrap 1a has the same general construction as the wrap 1 but is of a slightly different shape so as to fit the human foot.

With reference now to FIGS. 4, 5, 6, 7 and 8, it will be seen that the illustrated embodiment of the instant invention embodies a relatively large envelope made up of two like panels, an inner panel 4 and an outer panel 5, each being preferably of thermoplastic material such as a vinyl sheet or other thermoplastic that may be electronically heat sealed. The two panels 4 and 5 are joined across the bottom and up each side margin by a heat seal seam 6 to form an envelope having an open top, the envelope being substantially flat when not in use. Across the top of the envelope, panels 4 and 5 are provided with plastic strips 7 and 8, respectively, which also may be heat sealed to the upper margins of the panels. These plastic strips have interlocking means 9 therebetween which may be interlocked by pressure of the fingers and thumb to form a gastight closure. This closure is of the general type as shown in U.S. Letters Pat. No. 3,172,443 issued Mar. 9, 1965, entitled "Plastic Fastener." The top may be opened by merely separating the two strips by pulling them apart. The device is secured around a portion of an animal body by means of the commonly known form of slide fastener or zipper 10. The component parts 10a and 10b of the zipper are attached to a plastic strip 11 in each instance, the strip being secured in the side edge portions of the heat seal seam between the panel margins as seen clearly in the left-hand portion of FIG. 7.

Inside the large envelope above described, a materially smaller pouch or bag, generally indicated by numeral 12 is provided for the reception of a volatile refrigerant diagrammatically indicated at numeral 13. This pouch or bag 12 may be economically provided by heat sealing a single panel 14 of thermoplastic material to the inner face of the outer panel 5 of the large envelope by a marginal heat seal seam 15 which extends along the bottom of the panel 14 and upwardly along each side margin thereof. The top of the pouch 12 is closed by a known type of zipper 16 of the same character as the zipper 10 above discussed. The panel 14 is provided with numerous relatively small apertures 17 therethrough, through which vaporized refrigerant may pass into the large envelope, and spacer means 18 are preferably provided to prevent direct fact to face contact between the panel 14 and the inner panel 4 of the large envelope which contacts the body of the animal to prevent undue chilling of the affliction. These spacer means may be in the form of conical projections, or spaced ribs, as shown in FIGS. 7 and 8, and are integral with one of the panels 4 or 14, preferably the pouch panel 14. After the cold wrap has been placed over an affliction, the vaporized refrigerant entering the large envelope builds up a pressure therein which could reach as high as a 90 mm. column of mercury per square inch. While a horse, for example, can stand that pressure in the fetlock or pastern area in case of fracture, for most injuries, especially to tendons, a maximum pressure of 40—50 mm. of mercury is desired. With that in mind, to prevent the pressure rising to an undesirable extend, an adjustable automatic pressure valve, generally indicated by numeral 19, is mounted in an easily accessible position in the upper portion of the panel 5 in the large envelope. With reference to FIG. 5 it will be seen that the valve includes a base 20 attached to the panel 5 in any suitable manner, and a tubular housing 21 extending outwardly from the base. On a suitable seat over an outlet port in the housing is a ball valve 22 held down to close the port by means of a spring 23, one end of which abuts the valve and the other end of which abuts the interior of a cap 24 threaded over the housing 21, such cap being ported at the top as indicated at 25 so that vapor may escape therethrough if the pressure goes above the amount for which the spring has been set, whereby the pressure may be maintained at any desired value within the large envelope.

The volatile refrigerant diagrammatically indicated at 13 may be solidified carbon dioxide in free form and water may be used in the large envelope as a conductor for heat and cold or to increase vaporizing of the refrigerant. Water, however, should not be necessary because of the amount of air in the large envelope. The refrigerant could also be liquid carbon dioxide, liquid nitrogen or other well-known volatile refrigerants, in a proper container or cartridge that might be triggered and dropped into the pouch 12.

In use the instant invention is quite simple, and it is merely necessary to drop a volatile refrigerant in the pouch 12, pull the zipper 16 at the tope of the pouch and close the flexible fasteners 7, 8 and 9 at the tope of the large envelope, and then immediately wrap the device around the affliction and secure it in position by actuating the zipper 10. In a very short period of time the bandage will be reasonably tight in position because of the vaporization of the refrigerant inflating the large envelope. The pressure valve 19 may then be adjusted to whatever pressure may be desired for treatment of the particular affliction and will thereafter automatically maintain that pressure. Because of the spacing means 18, the cold wrap will not unduly chill the skin immediately. The use of the cold wrap plus the developed pressure to the desired amount will alleviate and relieve edema and pain in injuries involving joints, tendons, muscles, fractures, etc., and the cold wrap may be used repeatedly for a long length of time since it is highly durable. The cold wrap is also economical to manufacture, especially since it is a simple operation to heat seal the pouch panel 14 to the inside of the outer panel 5 of the envelope, and then it requires only one operation to heat seal the inner panel 4 of the envelope to the outer panel 5 and lock the component parts 10a and 10b of the attaching zipper 10 in the heat seal seam at the same time. This can very conveniently be done with suitable heat-sealing dies in an electronic heat-sealing press. The flexible gastight closing means at the top of the large envelope may be heat sealed or otherwise secured to the upper margin of the envelope at any convenient time during the process.

What is claimed is:

1. In a self-retaining cold wrap, an envelope open at the top only,
   complemental closure means on opposed side edges of said envelope,
   gastight closure means to close the open top thereof,
   a pouch carried by said envelope inside thereof to contain a volatile refrigerant, and
   said pouch having at least one opening in communication with the inside of said envelope to permit vaporized refrigerant to enter the envelope.

2. The cold wrap of claim 1, wherein said envelope includes outer and inner thermoplastic panels joined by a marginal heat seal seam extending around all sides thereof except the top.

3. The cold wrap of claim 1, including an adjustable valve in the outer part of said envelope to limit the pressure of vaporized refrigerant within said envelope.

4. The cold wrap of claim 1, including spacer means between the adjacent wall of said pouch and the inner wall of said envelope to prevent full face contact therebetween.

5. The cold wrap of claim 1, including a closure for the top of said pouch inside said envelope.

6. The cold wrap of claim 1, wherein said gastight closure means comprise
   flexible plastic strips secured one each to the upper margins of the inner and outer parts of said envelope, and carrying complemental interlocking portions thereon.

7. The cold wrap of claim 2, wherein said complemental closure means include thermoplastic strips carrying zipper components locked in said heat seal seam at the sides of said panels to secure the wrap around an affliction.

8. The cold wrap of claim 2, wherein said pouch comprises a thermoplastic sheet of less size than said envelope and is heat sealed except at the top to the inside face of said inner panel of the envelope.

9. The cold wrap of claim 4, wherein said spacer means are integral with one of said walls.

* * * * *